United States Patent [19]

Audeh et al.

[11] Patent Number: 4,469,807

[45] Date of Patent: Sep. 4, 1984

[54] CATALYST AND PROCESS FOR HYDROPROCESSING HEAVY OILS

[75] Inventors: Costandi A. Audeh, Princeton, N.J.; Tsoung-Yuan Yan, Philadelphia, Pa.

[73] Assignee: Mobil Oil Corporation, New York, N.Y.

[21] Appl. No.: 402,400

[22] Filed: Jul. 27, 1982

[51] Int. Cl.³ .......................... B01J 21/14; B01J 29/30
[52] U.S. Cl. ........................................ 502/74; 502/77; 502/252
[58] Field of Search ........................ 252/457, 455 Z; 208/251 H; 502/74, 77, 252

[56] References Cited

U.S. PATENT DOCUMENTS

| | | | |
|---|---|---|---|
| 3,867,282 | 2/1975 | Fischer et al. | 208/251 H |
| 4,152,250 | 5/1979 | Inooka et al. | 208/251 H |
| 4,266,672 | 5/1981 | Van Nordstrand | 252/455 Z |

Primary Examiner—Carl F. Dees
Attorney, Agent, or Firm—Alexander J. McKillop; Michael G. Gilman; Van D. Harrison, Jr.

[57] ABSTRACT

Disclosed is a catalyst and process for making same wherein sepiolite is ion exchanged with a Group Ib, IIb, IIIb, IVb, Vb, or VIIa metal, impregnated with VIa metal and exchanged with a magnesium salt with intervening processing steps of calcining. The catalyst composition is useful in removing metals and hydroprocessing of hydrocarbon feedstocks. The catalyst can also be mixed with a high silica/alumina ratio zeolite such as sodium ZSM-5 zeolite.

14 Claims, No Drawings

CATALYST AND PROCESS FOR HYDROPROCESSING HEAVY OILS

BACKGROUND OF THE INVENTION

1. Field of the Invention

This invention relates to techniques for making hydrotreating catalysts from sepiolite. This invention further relates to processes for hydrotreating or selectively demetallizing hydrocarbons and the hydroprocessing of heavy oils.

2. Description of the Prior Art

The presence of impurities such as sulfur, nitrogen and metals in the hydrocarbon feedstocks now utilized in the manufacture of hydrocarbon fuels such as gasoline and diesel fuel is becoming increasingly important. These feedstocks include crude oils, heavy oils, cracked oils, deasphalted oils, residual oils, vacuum gas oils, vacuum residue, oil from tar sands, shale and mixtures thereof. Sulfur, nitrogen and metal impurities are discharged into the atmosphere, together with the exhaust gas when these hydrocarbons are burned and are thus an increasing source of environmental pollution. The metals present in the feedstocks are deposited on catalysts utilized in the catalytic cracking and/or hydroprocessing of hydrocarbons. These deposits cause a marked decrease in the catalytic activity of the catalysts and their selectivity. U.S. Pat. Nos. 4,152,250 and 4,196,102 describe the demetallization of hydrocarbon feedstocks as well as their denitrification and desulfurization utilizing a catalyst which comprises one or more metals selected from the group consisting of transition metals and metals of Group IIb of the periodic table supported on sepiolite carrier. U.S. Pat. No. 4,196,102 discloses a catalyst comprising one or more metals selected from the group consisting of transition metals and metals of Group IIb of the Periodic Table supported on a sepiolite carrier to be useful in the demetallization of hydrocarbons. We have now discovered that, in sepiolite-based catalysts, the residual acidity (both the indiginous acidity and that created in the catalyst preparation steps) can be controlled if the exchanged catalyst is subsequently ion-exchanged with magnesium ions. The catalyst is further improved by incorporating with it, after the magnesium ion-exchange, a high silica/alumina ratio zeolite to obtain the desired type of acidity at the desired level.

SUMMARY OF THE INVENTION

This invention is directed to a process for making an improved sepiolite-based hydroprocessing catalyst by controlling and modifying the acidity of the catalyst. The process comprises treating the catalyst to effect back-exchange of magnesium ions for acidity control, optionally followed by mixing with low acidity zeolites. Initially natural or synthetic sepiolite is contacted with an aqueous solution of the salt of a metal such as cobalt to form a metal-exchanged sepiolite product. Subsequently the dried powdered product is contacted with an aqueous solution of a molybdenum compound and finally is contacted or ion-exchanged with an aqueous magnesium salt solution to effect ion-exchange of magnesium ions. The magnesium effectively reduces the acidity of the sepiolite by neutralizing the acid sites on the sepiolite. These acid sites are undesirable in hydroprocessing heavy residua. We have also discovered that this catalyst composition when admixed in pulverized form with a zeolite of the ZSM-5 type having a high silica/alumina mole ratio, (greater than 10) results in an enhanced hydroprocessing catalyst. A sodium-exchanged zeolite is preferred. In still another aspect this invention comprises the catalyst composition made by the aforedescribed procedures.

DETAILED DESCRIPTION OF THE INVENTION

Sepiolite is a porous, magnesium-silicate mineral similar to meerschaum. The sepiolite has the formula $2MgO.3SiO_2.4H_2O$ (Hackh's Chemical Dictionary, Fourth Edition, McGraw Hill Book Company, 1969). It occurs naturally as an alteration product of serpentine or magnesite. A synthetic counterpart can be prepared from cheaply available silicic compounds and magnesium salt and is marketed in the trade as magnesium trisilicate. For the purpose of the present invention any natural or synthetic sepiolite can be employed and both the alpha-type sepiolite and beta-type sepiolite that are known to exist can be used in the present invention.

The catalytic metal or metals to be supported on the sepiolite according to the present invention, are one or more of metals selected from the group consisting of metals of Group Ib and transition metals of the periodic table. Namely, use is made of one or more of compounds of elements selected from the group consisting of the compounds of Cu, Ag and Au of group Ib; Sc, Y, lanthanides and actinides of Group IIIb; Ti, Zr and Hf of Group IVb; V, Nb and Ta of Group Vb; Cu, Mo and W of Group VIa; Mn, Tc and Re of Group VIIa; and Fe, Co and Ni of iron group, Ru, Rh and Pd of palladium groups, Os, Ir and Pt of platinum group; and Zn, Cd and Hg of group IIb. Among these metals the preferable are Co, Ni, Fe, Cu, lanthanides, V, Cr, Mo and W. Furthermore, the combined use of both one or more compounds of the metal(s) selected from Co, Ni, Fe, Cu, and lanthanides, and one or more compounds of metal(s) selected from Mo, W and V is especially effective in the present invention.

These metals are generally utilized in the form of salts, e.g., nitrates, sulfates, salts of metallic acids, complex salts, or other water-soluble compounds. The addition of these compounds to sepiolite can be conducted according to conventional methods such as immersion, spraying and kneading as described in U.S. Pat. No. 4,196,102 which is incorporated herein by reference. For cobalt, nickel, iron, copper, etc. the preferred method is ion-exchange. For molybdenum, tungsten, vanadium, etc. the preferred method is impregnation. These compounds are employed generally in an amount of 1% to 15% by weight (as metal) on the basis of carrier (as anhydride), and usually 2% to 13% by weight is preferred.

To prepare the improved catalyst of this invention, sepiolite is first pulverized, if necessary, to a particle size of less than 100 mesh and is dried at a temperature of about 120° C. for approximately 2 hours and allowed to cool. The cooled dried clay is then mixed with approximately 4 times its volume of an aqueous solution containing a concentration of a first metal salt for ion-exchange that will give the desired ultimate percent of metal in the catalyst, preferably between 1 and 4 percent. The preferred method of metal incorporation is by ion-exchange. Preferred metals which can be used include cobalt, iron and nickel. When cobalt is the chosen metal, the cobalt salt is introduced by the use of an acid solution of cobalt of a pH of 1 to 3 that has the property of ion exchange, for the magnesium present in the sepiolite. The acidity of this ion-exchanged solution also affects ion-exchange for magnesium ions in the sepiolite creating an undesirable acidity of the sepiolite. The most preferred metal is cobalt. The sepiolite is separated from the aqueous solution and is washed with water, at a ratio of 2 volumes of water to 1 of sepiolite. The washed metal-exchanged sepiolite is then dried at approximately 120° C. for approximately 2–3 hours and is calcined then at 500° C. for 2–4 hours.

The calcined, metal-exchanged sepiolite is then pulverized, and the pulverized material is mixed with an aqueous solution containing the required amount of a salt containing the second metal such as ammonium meta-molybdate. This solution is maintained at a pH of 10–12 with ammonium hydroxide and in sufficient concentration to provide a concentration in the final catalyst of 8–15 percent by weight of molybdenum. The ammonium ion in this solution is also ion-exchanged with magnesium and hydrogen ions in the sepiolite to form ammonium salts from which undesirable acidity is created when the salts later are calcined. The thus treated sepiolite is then separated from the aqueous solution and is dried at 120° C. for 2 hours and calcined at approximately 500° C. for 2–4 hours.

In a third step, the calcined metal-exchanged/impregnated sepiolite is then pulverized and saturated with an aqueous solution of magnesium salt maintained at a pH of approximately 6.5 to 7 by the addition of a soluble magnesium compound, to effect ion-exchange between acidity of the sepiolite and magnesium ions, such as magnesium acetate. The concentration of magnesium in the final product is between 18 and 25 percent by weight. This ion-exchange is necessary to eliminate the undesirable residual acidity of the sepiolite catalyst carrier which was generated in the first metal exchange step carried out in acid solution and the ammonium ion exchange in the second step. The solid is then separated, dried at 120° C. for 2 hours and calcined at 500° C. for 2–4 hours.

As noted previously, the catalyst thus formed can be admixed with a high silica/alumina ratio zeolite such as sodium ZSM-5. We have discovered that this low acidity, high silica/alumina ratio zeolite provides the desirable and necessary acidity required for catalytic reactions. The acidity of this zeolite can be controlled by ion-exchange with potassium, or sodium. The desirable acidity as expressed by an alpha value is less than 10, and preferably less than 1. As is known in the art, the alpha value is an approximate indication of the catalytic cracking activity of the catalyst compared to a standard catalyst and it gives the relative rate constant (rate of normal hexane conversion per volume of catalyst per unit times). It is based on the activity of this highly active silica/alumina cracking catalyst taken as an alpha of 1 (rate constant=0.016). The alpha test is described in U.S. Pat. No. 3,354,078 and in the Journal of Catalysis, Vol. IV, pp. 522–529 (August, 1965) both of which are incorporated herein by reference. These zeolites may be described as ones wherein the silica/alumina mole ratio ranges upwardly from 10. The two catalysts in admixture are pulverized to the appropriate particle size for use in a catalyst bed. The ratio by weight of sepiolite catalyst to the high silica/alumina ratio zeolite preferably is between 2 and 100. Sodium-exchanged zeolites of the ZSM-5 type are preferred. Representative of the ZSM-5 type zeolites are ZSM-5, ZSM-11, ZSM-23, ZSM-35 and ZSM-38. ZSM-5 is disclosed and claimed in U.S. Pat. No. 3,702,886 and U.S. Pat. No. Re. 29,948; ZSM-11 is disclosed and claimed in U.S. Pat. No. 3,709,979. Also, see U.S. Pat. No. 3,832,449 for ZSM-12; U.S. Pat. No. 4,076,842 for ZSM-23; U.S. Pat. No. 4,016,245 fort ZSM-35 and U.S. Pat. No. 4,406,839 for ZSM-38. The disclosures of these patents are incorporated herein by reference.

The catalyst of the present invention can be employed in a wide variety of hydrotreating reactions for a wide range of hydrocarbons. The catalyst is particularly useful for desulfurization, denitrification and demetallation of heavy oils. In these processes the feedstock and the catalyst should be contacted at a temperature between 350° C. and 450° C., a hydrogen pressure of between 500 and 1000 psig, and an LHSV of 0.1 to 10.

EXAMPLE 1

A sepiolite catalyst containing 2.5% by weight of cobalt and 12% by weight of molybdenum, and fully saturated with magnesium was prepared according to the process described herein.

EXAMPLE 2

A sepiolite catalyst composition was prepared containing 2.5% by weight of cobalt and 12% by weight of molybdenum following the procedure described in U.S. Pat. No. 4,152,250.

EXAMPLE 3

A third sepiolite catalyst composition was prepared by mixing 9 parts of the catalyst prepared in Example 1 with 1 part of a sodium-exchanged zeolite NaZSM-5 having a silica/alumina ratio of 26,000 to 1.

EXAMPLE 4

In separate runs, a 16 cc sample of each of the catalysts prepared as described above was packed in a reactor, and the reactor was placed in a three-zone, thermostatically-controlled furnace. The reactor was then sulfided at 375° C. using 1% hydrogen sulfide in a hydrogen carrier until the gas exiting the reactor turned moist lead acetate paper black. This indicated that all the cobalt and molybdenum in the catalyst had reacted with the $H_2S$.

The reactor containing the sulfided catalyst was then connected to a hydrogen source and the system was pressurized to a desired pressure, usually 1500 psig, with hydrogen. When the required pressure and temperature were reached, hydrogen flow was adjusted such as the equivalent of 6,000–8,000 standard cubic feet of hydrogen/barrel of feed to be processed would flow over the catalyst. When the correct pressure, temperature and amount of hydrogen gas were adjusted, the appropriate amount of a feedstock of an API gravity of 2.8 containing 5.77% by weight of sulfur and 58 ppm nickel and 186 ppm of vanadium was flowed over the catalyst. Samples were then taken from the product at regular intervals, and analyzed. Table 1 shows the data obtained from this analysis and demonstrates the effectiveness of the composition of this invention (Example 1 and 3) over the prior art catalysts of Example 2.

TABLE 1

Desulfurization/Demetallation of Arab Heavy Vacuum Residue at 1500 psig, 0.25 LHSV and 6000-8000 SCF/bbl Using the Different Catalysts at 400° C. at 42 Volumes per Volume of Catalyst

| | CONCENTRATION BY WEIGHT IN TREATED PRODUCT | | | | | |
|---|---|---|---|---|---|---|
| | Sulfur | | Nickel | | Vanadium | |
| | Wt % | % Removed | PPM | % Removed | PPM | % Removed |
| Feedstock | 5.77 | — | 58 | — | 186 | — |
| Example 1 | 2.3 | (60) | 25 | (53) | 26 | (86) |
| Example 2 | 2.9 | (49) | 37 | (30) | 69 | (62) |
| Example 3 | 1.9 | (67) | 17 | (69) | 18 | (90) |

The data in Table 1 is significant in that the reduction in sulfur, nickel and vanadium in the resid treated with catalyst made according to Example 1 demonstrate that treating a catalyst with magnesium as disclosed herein substantially improves the ability of the catalyst to remove sulfur, nickel and vanadium from a heavy oil. Example 2 illustrates the limited abilities of the prior art catalyst compositions wherein no magnesium treatment has been performed. Example 3 demonstrates the additional improvement in the ability of the catalyst to remove nickel, sulfur, and vanadium when the catalyst is combined with a sodium exchanged zeolite.

This invention is particularly noteworthy in that it provides a method of controlling the acidity of a sepiolite based, based-exchanged catalyst by providing a means of neutralizing the acid sites with magnesium ions. The invention is further noteworthy in that it provides a method for closely controlling the acidity of a catalyst mixture by incorporating a sodium exchanged zeolite having a high silica/alumina ratio.

What is claimed is:

1. A process for making an improved sepiolite-based hydroprocessing catalyst comprising first contacting said sepiolite with an aqueous solution of a first metal salt, then contacting the resultant metal ion-exchanged sepiolite with an aqueous solution of a compound of a second metal selected from the group consisting of molybdenum, tungsten and vanadium, and finally contacting the resultant metal-exchanged sepiolite product with an aqueous solution of a magnesium compound, thereby effecting a magnesium ion-exchange with the metal-exchanged sepiolite product and neutralizing acid sites on said sepiolite product.

2. The process of claim 1 wherein said first metal salt is a salt of a metal selected from the group consisting iron, cobalt and nickel.

3. The process of claim 1 wherein said first metal salt is a cobalt salt.

4. The process of claim 1 wherein said second metal is molybdenum.

5. The process of claim 1 wherein the concentration of said first metal in elemental form in the resultant catalyst product is between about 1 and about 4 percent by weight and the concentration of said second metal in elemental form is between about 8 and about 15 percent by weight.

6. The process of claim 1 wherein the concentration of added magnesium in the resultant catalyst product is between 18 and 25 percent by weight.

7. The catalyst produced according to the method of claims 1, 2, 3, 4, 5 or 6.

8. A hydrodemetalization catalyst comprising a mixture of a catalyst produced by the process of claims 1, 2, 3, 4, 5 or 6 and a high silica/alumina mole ratio zeolite.

9. The catalyst of claim 8 wherein the ratio by weight of metal-exchanged sepiolite to zeolite is between about 2 and about 100.

10. The catalyst composition of claim 8 wherein the mole ratio of silica to alumina in said zeolite is greater than 10.

11. The catalyst composition of claim 8 wherein the zeolite is a zeolite selected from the group consisting of ZSM-5, ZSM-11, ZSM-23, ZSM-35 and ZSM-38.

12. The catalyst composition of claim 8 wherein the zeolite is ZSM-5 zeolite.

13. The catalyst composition of claim 8 wherein said zeolite is a sodium-exchanged zeolite.

14. A process for making a hydroprocessing catalyst comprising the steps of:
(a) pulverizing sepiolite;
(b) drying the pulverized sepiolite;
(c) contacting the cool pulverized sepiolite with an aqueous solution of a salt of a metal selected from the group consisting of iron, cobalt and nickel to form a metal-exchanged sepiolite product;
(d) washing, drying and calcining said metal-exchanged sepiolite;
(e) pulverizing the calcined product obtained in (d);
(f) contacting said calcined product with an aqueous solution of a compound containing a metal selected from the group consisting of molybdenum, tungsten and vanadium;
(g) calcining the resulting metal-exchanged/metal impregnated product of (f);
(h) pulverizing the calcined product obtained in (g) and saturating it with an aqueous solution of a magnesium salt; and
(i) separating, drying and calcining the solid product obtained in (h) and drying and calcining it.

* * * * *